United States Patent [19]

Smithers

[11] Patent Number: 4,905,587
[45] Date of Patent: Mar. 6, 1990

[54] APPARATUS FOR APPLYING A CIRCUMFERENTIAL LAYER OF LIQUID TO A SAUSAGE

[75] Inventor: James P. Smithers, Scottsdale, Ariz.

[73] Assignee: Conagra, Inc., Omaha, Nebr.

[21] Appl. No.: 133,632

[22] Filed: Dec. 16, 1987

[51] Int. Cl.⁴ .................... A22C 7/00; A22C 11/00
[52] U.S. Cl. ........................................ 99/534; 17/35;
   99/450.6; 99/450.7; 99/494; 99/516; 425/133.1
[58] Field of Search ............... 99/516, 534, 532, 533,
   99/483, 467, 353, 494, 478, 482, 450.6, 450.7;
   17/1 R, 35, 33, 41; 426/92, 513, 524; 425/133.1

[56] References Cited

U.S. PATENT DOCUMENTS

| Re. 28,281 | 12/1974 | Bridgeford | 117/96 |
|---|---|---|---|
| 1,602,331 | 10/1926 | Britton . | |
| 2,568,491 | 9/1951 | Edwards | 17/41 X |
| 3,330,669 | 7/1967 | Hollenbeck | 99/166 |
| 3,649,299 | 3/1972 | Sholl | 99/534 X |
| 3,672,001 | 6/1972 | Greider | 17/33 |
| 3,699,877 | 10/1972 | Criss et al. | 99/534 |
| 3,751,202 | 8/1973 | Coleman et al. | 425/133 |
| 3,877,361 | 4/1975 | Trainor et al. | 99/478 |
| 3,959,503 | 5/1976 | Laugherty | 426/283 |
| 4,093,414 | 6/1978 | Swintovy, Jr. | 425/133.1 |
| 4,278,694 | 7/1981 | Chiu | 426/135 |
| 4,442,868 | 4/1984 | Smith et al. | 138/118.1 |
| 4,481,872 | 11/1984 | Matthews et al. | 99/353 |
| 4,501,542 | 2/1985 | Nausedas | 425/133.1 |
| 4,504,500 | 3/1985 | Schneck et al. | 426/265 |
| 4,518,619 | 5/1985 | Chiu | 426/265 |
| 4,532,858 | 8/1985 | Hershfeld | 99/467 X |
| 4,569,101 | 2/1986 | Tribbett | 17/41 |
| 4,570,298 | 2/1986 | Tribbett | 17/41 |
| 4,687,430 | 8/1987 | Morris et al. | 425/133.1 |
| 4,689,237 | 8/1987 | Fabre | 99/483 |
| 4,731,906 | 3/1988 | Matthews et al. | 17/1 R |

FOREIGN PATENT DOCUMENTS 625912  8/1961  Canada .

OTHER PUBLICATIONS

DUAL EXTRUSION SYSTEM, published by Viskase Food Casings, date unknown.

Primary Examiner—Timothy F. Simone
Attorney, Agent, or Firm—Willian Brinks Olds Hofer Gilson & Lione

[57] ABSTRACT

There is disclosed an improvement to an apparatus, and a method for applying a thin layer of liquid at the circumference of a stream of meat product before it enters a casing. Preferably, the liquid being applied is liquid smoke thereby avoiding the necessity of further smoking treatment of the sausage to achieve the desired taste and appearance of a smoked sausage.

35 Claims, 10 Drawing Sheets

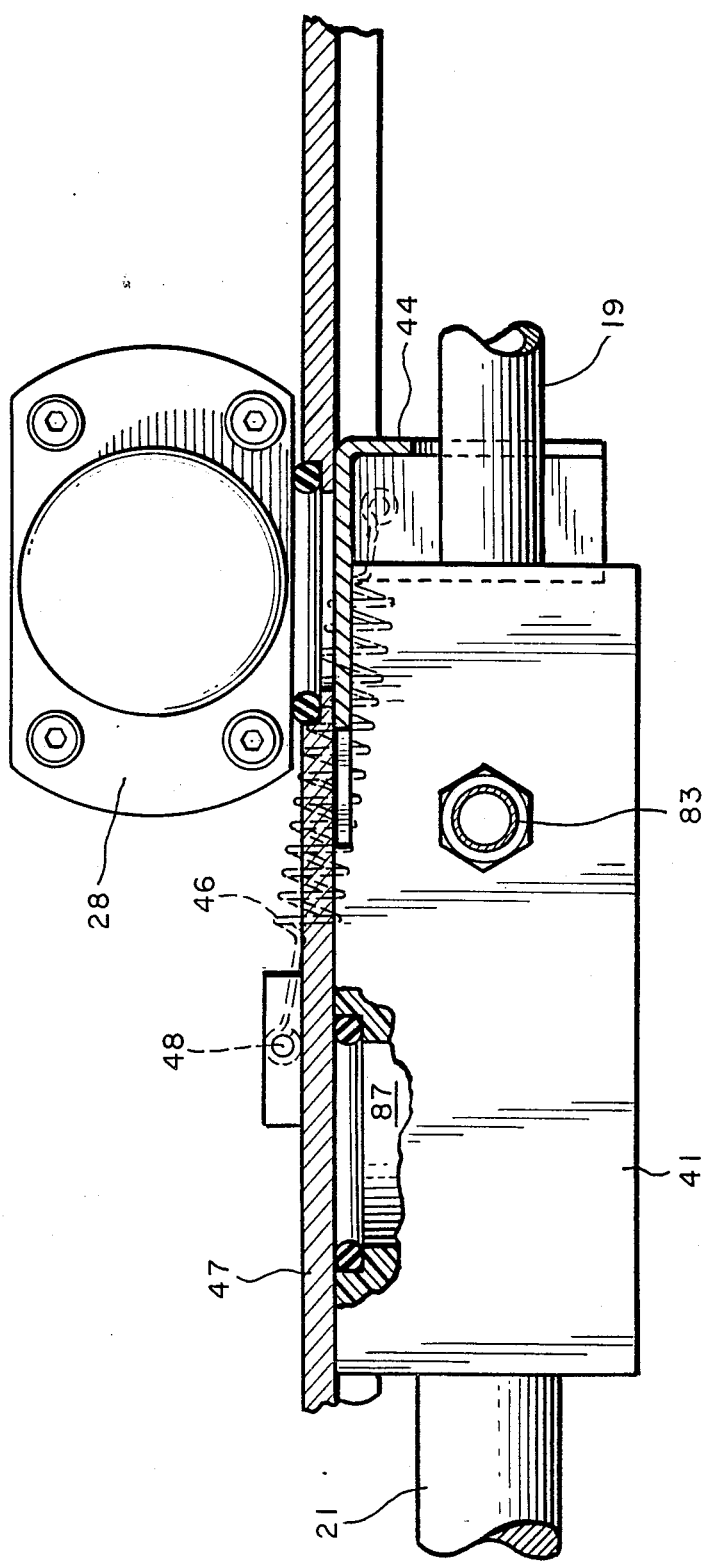

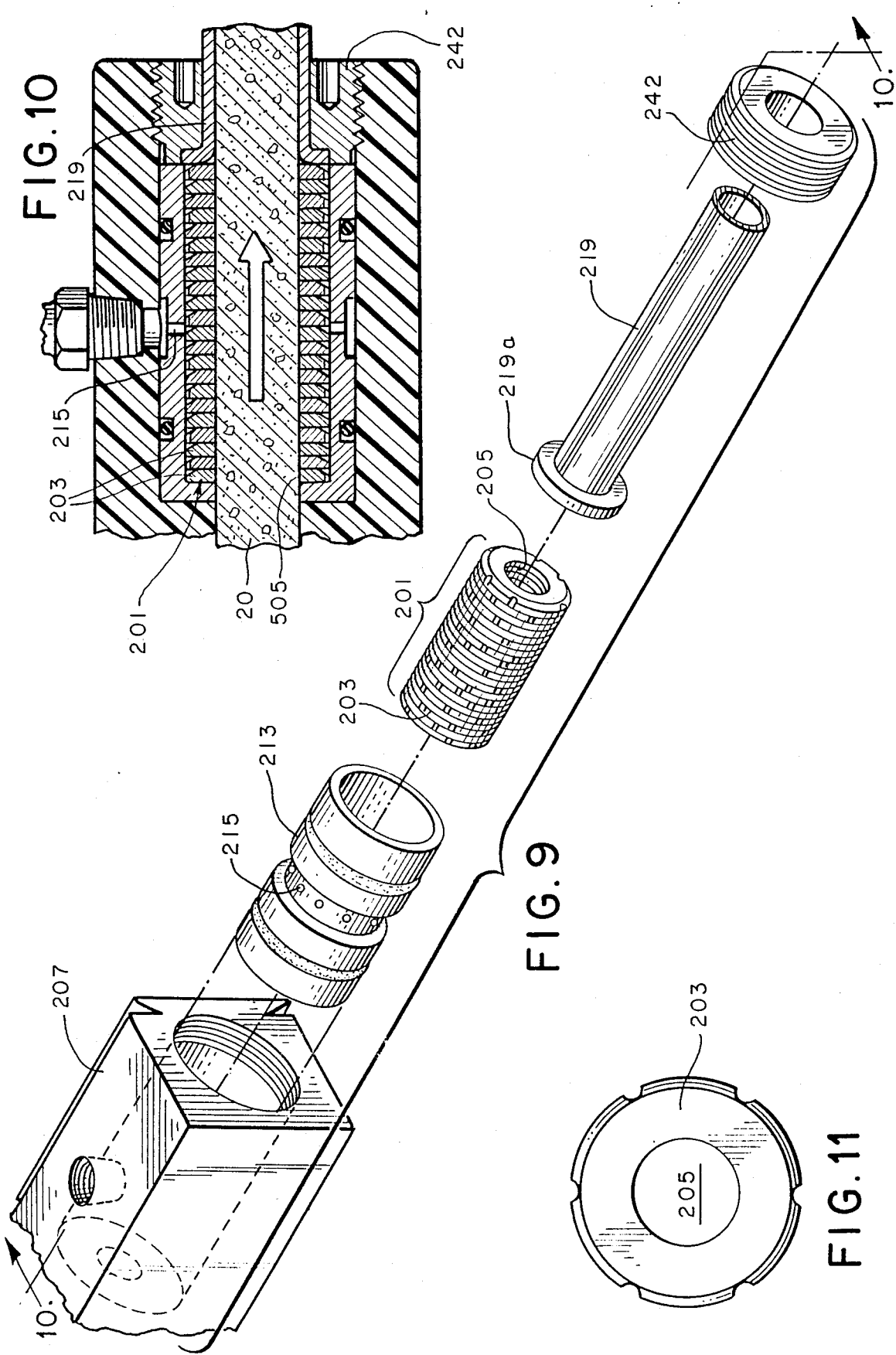

2

APPARATUS FOR APPLYING A CIRCUMFERENTIAL LAYER OF LIQUID TO A SAUSAGE

BACKGROUND OF THE INVENTION

The present invention relates to apparatus for making sausage by stuffing a stream of meat product into a casing. More particularly, the invention relates to the application of a thin circumferential layer of liquid around the stream of meat product. Preferably, the liquid applied is a liquid smoke composition to thereby provide the flavoring and coloring normally acquired by application of natural smoke, or liquid smoke to the external surface of the sausage casing.

The smoking of sausages has been a common practice for centuries. In the traditional method, sausages that have been stuffed in casings are hung in a smokehouse, i.e. a room which is filled with the selected smoke. As a result, the airborne chemicals seep through the casing and into the external surface of the meat product to thereby achieve the desired flavoring and coloring of the sausage. Naturally, this traditional smoking of sausage is a fairly time and space consuming process.

One development which has been made to improve on the traditional smoking process has involved the use of liquid smoke. In particular, aqueous solutions containing the desired elements from natural smoke have been produced. The liquid smoke has been applied to the external surface of the stuffed casing by spraying the sausages, exposing them to atomized liquid smoke, or by cascading liquid smoke over the sausages. In this way, liquid smoke has been used to impart the flavoring and coloring aspects otherwise achieved by traditional smoking.

Unfortunately however, the spraying of liquid smoke has its disadvantages. For instance, the spraying, atomizing, or cascading of liquid smoke typically produces fumes and excessive waste of the liquid even though it is recycled. Added to this is the fact that liquid smoke is a relatively corrosive liquid which also has a high B.O.D. value. Accordingly, the conventional uses of liquid smoke can have negative impacts on occupational safety and the environment.

In spite of these disadvantages of spraying liquid smoke, it has generally not been feasible to blend the liquid smoke with the meat emulsion before it is stuffed into the casing. Typically, this liquid smoke has a relatively low pH which have made it incompatible with the meat product emulsion. In particular, the emulsion that is commonly used to make hot dogs would break down, i.e. the water and fats would separate, if the liquid smoke were added to it. Also, because a surface treatment is what is generally desired, especially with respect to typical coloring, it has been important to apply the liquid smoke to the external surface of the stuffed casing, rather than adding the liquid smoke directly to the meat emulsion.

SUMMARY OF THE INVENTION

The present invention is an improvement to an apparatus, and a method for applying a thin layer of liquid at the circumference of a stream of meat product before it enters a casing. The invention also includes the sausage made according to this method. In the preferred embodiment, the liquid being applied is liquid smoke thereby avoiding the necessity of further smoking treatment of the sausage to achieve the desired taste and appearance of a smoked sausage.

In accordance with the improvement aspect of the invention, the invention is an improvement for an apparatus for making sausages by stuffing a stream of meat product into a casing. The improvement comprises means for applying a thin layer of liquid at the perimeter of the stream of meat product. The means for applying includes a pump means for pumping the liquid. Also included is a first nozzle means for directing a stream of the meat product in a direction toward the casing. In addition, a second nozzle means is included for directing a stream of liquid so as to be applied as a thin layer at the perimeter of the stream of meat product. Preferably, the layer of liquid is applied around the entire circumference of the stream of meat product.

In accordance with the method aspect of the invention, liquid smoke is applied to sausages by pumping a thin layer of liquid smoke around a stream of meat product before the meat product is stuffed in a casing. Preferably, this method is achieved by using a first and second nozzle means as described above.

It should be noted that the term "sausage" as used in this specification and the appended claims, is intended to have a relatively broad interpretation encompassing cooked or uncooked meat products which are stuffed in a casing. Also, it should be noted that the term "meat product" as used in this specification and the appended claims, is likewise intended to have a relatively broad interpretation encompassing all types of meat compositions, meat blended with various fillers and enhancers, as well as meat substitutes, such as vegetable proteins.

The present invention offers the advantage that it provides a method of applying a liquid to the external surface of the meat product, which method is relatively efficient. In particular, the liquid, such as liquid smoke, is applied during the stuffing process, thereby avoiding the need for a separate spraying or soaking step. In addition, because the liquid is applied within the casing rather than being sprayed from the outside, the amount of liquid needed to obtain the same loading on the meat product is greatly reduced. Furthermore, the occupational safety and environmental hazards associated with the spraying of liquid smoke are avoided by the present invention.

These and other objects, advantages, and features of the present invention will be better understood upon review of the detailed description of the preferred embodiment read in conjunction with the accompanying drawings.

BRIEF DESCRIPTION OF THE DRAWINGS

FIG. 4b is a magnified view showing the operation of the sliding valve shown in FIG. 3.

FIG. 9 is an exploded view of an alternative embodiment of the nozzle means.

FIG. 10 is a cross-sectional assembled view taken along line 10—10 of FIG. 9.

FIG. 11 is a view of a disc from FIG. 9.

DETAILED DESCRIPTION OF THE PREFERRED EMBODIMENTS

Figure 1:
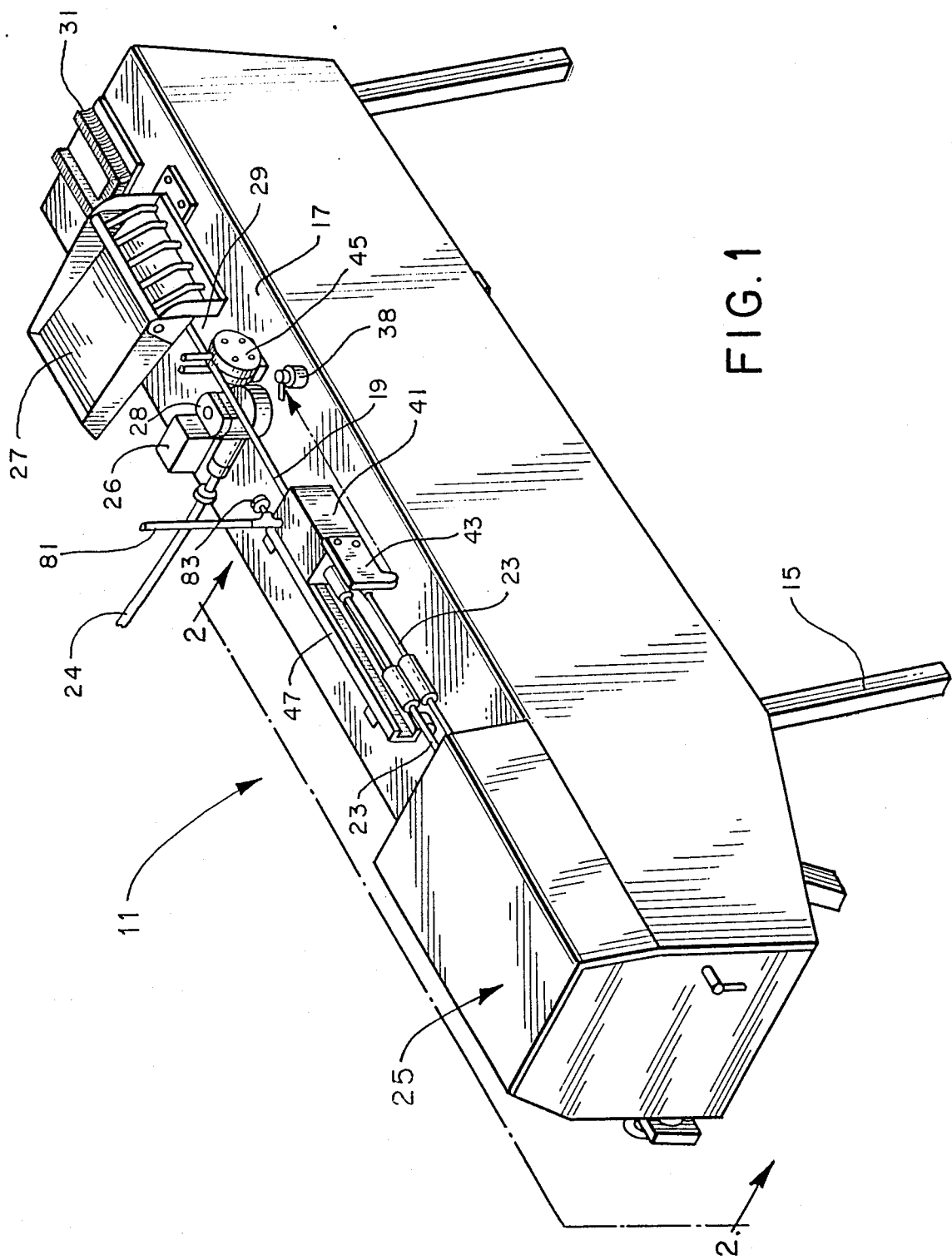
FIG. 1 is a perspective view of a sausage making machine equipped in accordance with the preferred embodiment of the present invention.

Referring to the drawings, FIG. 1 is a perspective view of an otherwise conventional and commercially available hot dog making machine 11 equipped with the preferred embodiment of the present invention. In particular, the machine shown is a Frank-A-Matic Model DB2a machine manufactured and sold by the Townsend Engineering Company. The invention is also well suited to work on other Townsend Frank-A-Matic models. This machine is designed to stuff, link, and hang franks such as hot dogs, in a continuous operation.

Although the preferred embodiment of the invention involves the use of a relatively high-speed frank stuffing machine, the invention is also well suited to work with other types of sausage stuffing machines. For instance, the invention can be used with a Karl Schnell or "V"MAG continuous stuffing machine.

The machine in FIG. 1 includes a housing 13 supported on legs 15. The housing includes a top surface 17.

A stuffing horn 19 is adapted to reciprocally move between a stuffing and a retracted position by a rod 21 connected to an air cylinder (not shown) in the rear portion 25 of the housing. In the drawing, the stuffing horn 19 is shown about midway between these two positions. The machine 11 also includes a follower rod 23 which is likewise moved by another air cylinder between a stuffing and retracted position.

Meat product emulsion is brought through tube 24 into a metering pump 28. Preferably, the pump 28 is set to deliver a pressure of about 115 p.s.i. An air operated valve 26 is adapted to stop the flow of meat when the the stuffing horn is brought away from the stuffing position.

The machine 11 also includes a casing hopper 27 which holds a number of shirred casings. After a casing has been completely filled, the stuffing horn 19 is retracted and a casing feed mechanism 29 loads a casing into the proper position for it to be stuffed. A linker apparatus 31 is mounted on the top surface 17 and is adapted to form the stuffed casing into links of the desired length. Typically, a take away conveyor (not shown) is provided for hanging the linked sausages in loops and transporting them to the next process. With the exception of the stuffing horn 19 and the air operated valve 26, these components 13–31 are all conventional components of the above-named commercially available machine and thus do not form a part of the present invention.

The preferred liquid to be applied by the present invention is a liquid smoke. In particular, it is preferred to use the invention to apply liquid smoke to the external surface of the stream of meat product to thereby avoid the necessity of further smoking treatment to achieve the desired flavor and color of a smoked sausage.

Preferably the liquid smoke used is a commercially available aqueous liquid smoke solution. Most preferably, the commercially available liquid smoke is not used at its full strength as in conventional uses of liquid smoke. Rather, it is preferred to dilute the liquid smoke before its use in the present invention. Most preferably, the liquid smoke used is that sold by RED ARROW, INC. under the designation "C-10" which is diluted with 5 parts water for 1 part liquid smoke. Most preferably, this smoke is buffered to a pH of about 4.5. Alternatively, the "C-10" liquid smoke can be used at its conventional pH of about 2.2.

Because the liquid smoke is preferably made to pass through small channels, it is preferable that the liquid smoke not contain excessive suspended particulate matter.

Although the preferred liquid to be applied is liquid smoke, other types of liquids can also be applied with the present invention. For example, it has been found to provide certain advantages to add a circumferential layer of mere water to the stream of meat product as it is being stuffed. In particular, a layer of water has been found to increase the speed at which a Frank-A-Matic can be operated. While not wishing to be bound by any particular theory, this result is likely due to the lubrication that is provided by the water. Other materials such as oils that can act as lubricants may also be used to increase the stuffing speed.

Another potential advantage of applying a circumferential layer of water to the stream of meat product when stuffing a sausage is that the layer of water has been observed to highlight the meat particles. In particular, it has been observed that in coarse ground sausage products, such as a polish sausage, the large particles of meat next to the surface are made to appear more dominant. While not wishing to be bound by any particular theory, this result is currently believed to be caused by a particle size differentiation, i.e. the larger particles are brought more to the surface than they would have been without the application of the circumferential layer of water.

Another example of a liquid to be applied is a simple colorant. That is, the present invention may be used to apply a layer of coloring to the outside surface of the meat product. In conventional processes, this surface coloring is typically applied by including the colorant in specially treated casing and then allowing the colorant to migrate into the sausage. Accordingly, the present invention can be used to avoid the expense of using these special casings.

Preferably, the colorant is added in a layer which surrounds the entire circumference of the stream of meat product. Alternatively, the nozzle means are configured so as to produce colored stripes on the final sausage. For example, hot dogs can be produced which include dark imitation grill marks.

In other alternative embodiments, flavorings, other than liquid smoke, and other additives, such as preservatives, may also be applied in liquid form by the present invention. This is particularly advantageous when a surface application is desirable for reasons of processing efficiency or for reasons relating to the quality or appearance of the sausage. For example, it may be desirable to apply a layer of honey, or honey flavoring, to a ham containing sausage.

In yet another alternative embodiment, the liquid to be added can be a casing treatment. A casing treatment can be applied in liquid form to either increase or decrease the adhesion of the casing to the sausage product. As one example, a liquid can be applied by the present invention to avoid the necessity of using an "Easy-Peel" casing which has had its internal surface coated to thereby improve the peel-ability of the casing from the sausage after cooking. In particular, it has been observed that the aqueous liquid smoke used in the preferred embodiment has the effect of increasing the peel-ability of the casing after cooking. Accordingly, the present invention can be used to avoid the cost of obtaining the more expensive casings with the "Easy-Peel" feature built in.

Alternatively, it may be desirable to use the present invention to actually increase the adhesion of the casing to the sausage. For example, a sugar solution, or some other liquid, could be applied to a sausage product to provide for better adhesion of the casing to the sausage.

Figure 2:
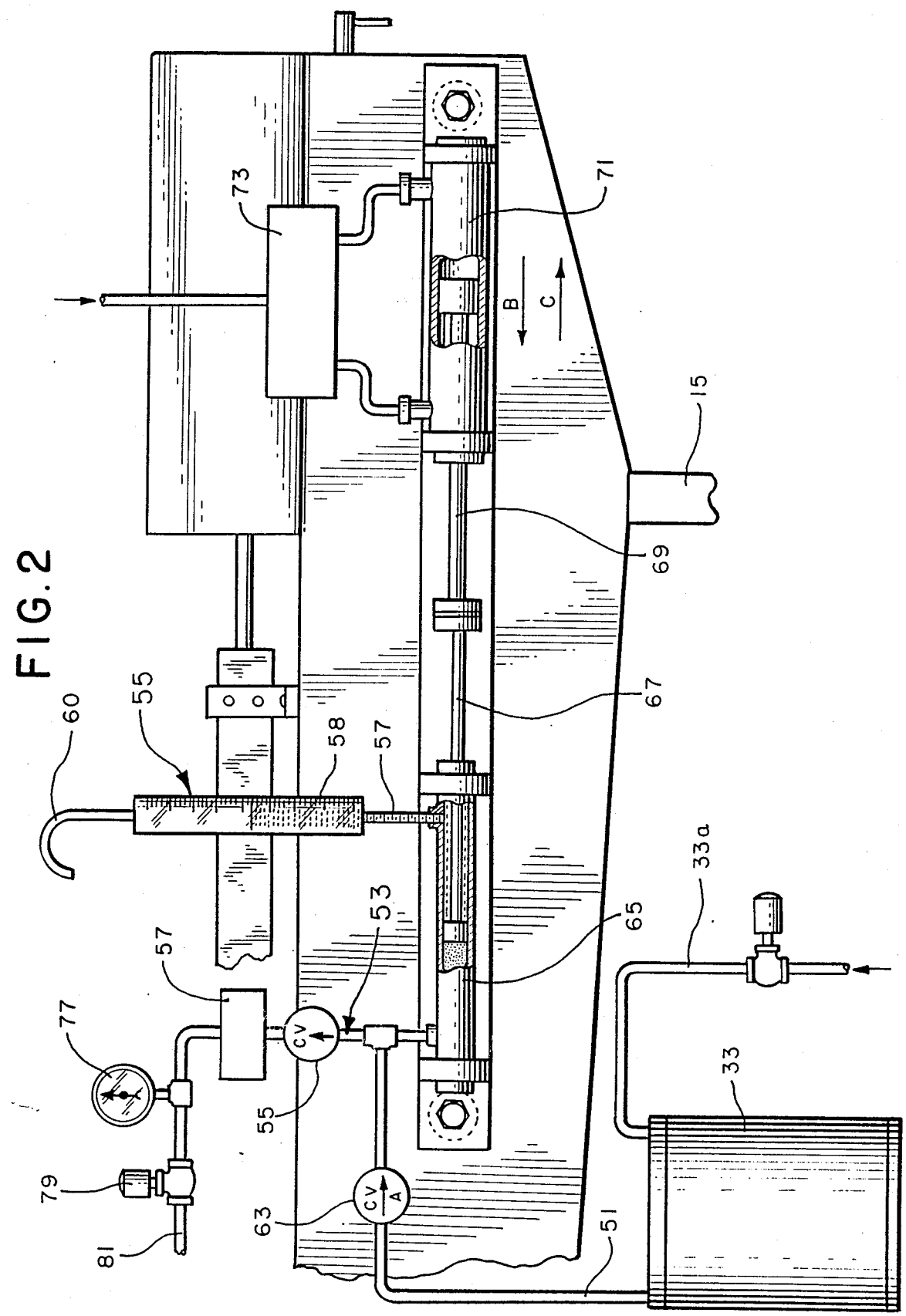
FIG. 2 is a view in partial cross-section from the opposite side of the machine shown in FIG. 1 illustrating the flow path of the liquid smoke for the machine depicted in FIG. 1.

Referring to FIG. 2, which is a partial view of the back side of the machine 11, the machine includes a pressurized tank 33 for holding a reservoir of liquid smoke. The tank 33 is pressurized at about 20 p.s.i. by air from line 33a. Preferably, the capacity of the tank is about 8 gallons which is presently half the amount needed for one 8 hour shift of operation for this particular Frank-A-Matic.

The liquid smoke leaves the tank 33 through line 51 and passes through a check valve 63 which allows liquid to flow in the direction of arrow A, but not in reverse. The line 51 connects to a hydraulic cylinder 65. This hydraulic cylinder 65 is mounted on plate 35 and includes a rod 67 which communicates with the pushing rod 69. The pushing rod 69 is driven by the air cylinder 71. As a result, when the air cylinder 71 is activated in direction B, by the 4-way valve 73, the pushing rod 69 pushes against the rod 67 to thereby pressurize the liquid contents of the hydraulic cylinder 65. Also, when the air cylinder 71 is activated by the 4-way valve to move in the opposite direction C, the pusher rod 69 retracts and the hydraulic cylinder 65 is thereby allowed to fill with liquid from the pressurized tank 33. Because the diameter of the air cylinder 71 is larger than the diameter of the hydraulic cylinder 65, the pressure applied on the liquid in the hydraulic cylinder is multiplied over the pressure applied within the air cylinder 71. In particular, the most preferred pressure within the air cylinder 71 is about 90 p.s.i. and the pressure exerted against the liquid in the hydraulic cylinder 65 is about 250 p.s.i.

A flow gauge 55 is mounted on the hydraulic cylinder 65 in order to observe the volume of liquid smoke being applied to the stuffing block during each cycling of the stuffing horn. This gauge consists of a tube which communicates with the side of the hydraulic cylinder 65 opposite the side which receives the liquid smoke. This tube 57 in turn communicates with the calibrated tube 58 which in turn communicates with the venting tube 60. A colored liquid is provided in the gauge so that when the cylinder reciprocates, the volume of liquid smoke displaced is indicated by the change in height of the colored liquid in the calibrated tube 58. Most preferably, the tube 58 is calibrated so as to read in cc's of liquid smoke, thus taking into account the volume displaced by the rod 67.

The line 51 is also connected to line 53 which ultimately communicates with the stuffing block 41. In particular, a check valve 55 is included to prevent fluid from returning to the hydraulic cylinder 65 when it is being recharged. Also, a filter 57 is included to strain any solid particulate matter from the liquid smoke. The avoidance of any such particulate is particularly important in view of the relatively small channels in the preferred nozzle structure described below. Preferably, the filter is a Watts steam filter including a stainless steel screen with holes of 15 microns.

A pressure gauge 77 is used to monitor the pressure put out by the hydraulic cylinder 65. In this embodiment, the pressure is adjusted to be between about 200 and about 250 p.s.i., most preferably about 215 p.s.i. On the other side of the pressure gauge is an electronic shut-off valve 79 which is adapted to stop the flow of liquid smoke when the stuffing block 41 is pulled back from the stuffing position.

Figure 3:
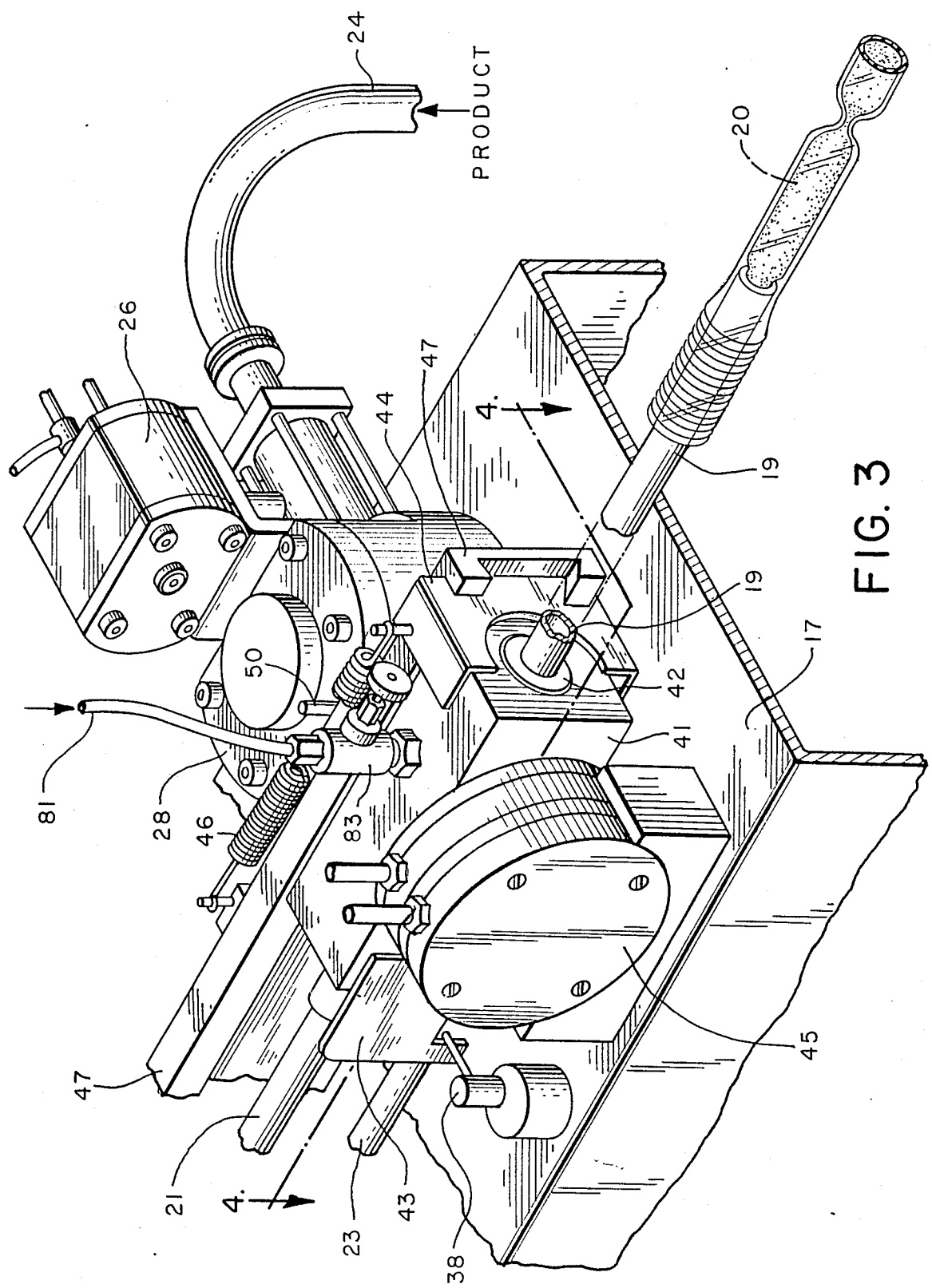
FIG. 3 is magnified view of the stuffing block, in position to receive meat product, of the machine depicted in FIG. 1.

On the other side of the electric shut off valve is a line 81 which communicates with the needle valve 83 shown in FIGS. 1 and 3.

The needle valve 83 is mounted on the stuffing block 41 and is used to adjust the flow rate of liquid smoke into the stuffing block. As described, this flow rate is monitored by the flow gauge 55.

Referring to FIGS. 1 and 3, the meat product emulsion is pumped by the metering pump 28 into the stuffing block 41. The liquid smoke is brought into the stuffing block 41 though the needle valve 83. The stuffing horn 19 is securely, yet removably fastened into the end of the stuffing block 41 by the spanner nut 42. Alternatively, rather than threading the spanner nut 42 directly into the stuffing block 41, a replaceable block end can be provided with the appropriate threads. Such a replaceable block end can be attached within the end of the block by means such as countersunk screws. This alternative may be desirable in that the end could be replaced rather than the entire stuffing block if the threads were damaged.

A track 47 is provided for the stuffing block 41 to slide in as it moves between the stuffing and retracted positions. An air operated pushing cylinder 45 is mounted on the top surface 17 in this embodiment. This cylinder 45 is adapted to push the stuffing block 41 against the metering pump 26 when it is in the stuffing position. In particular, by means of switches and valves, the cylinder 45 is actuated as the stuffing block comes into position, and released as the stuffing block is ready to move away. This has been found to provide a better seal between the stuffing block 41 and the metering pump 28 to thereby lessen leakage of the meat product.

Figure 4A:
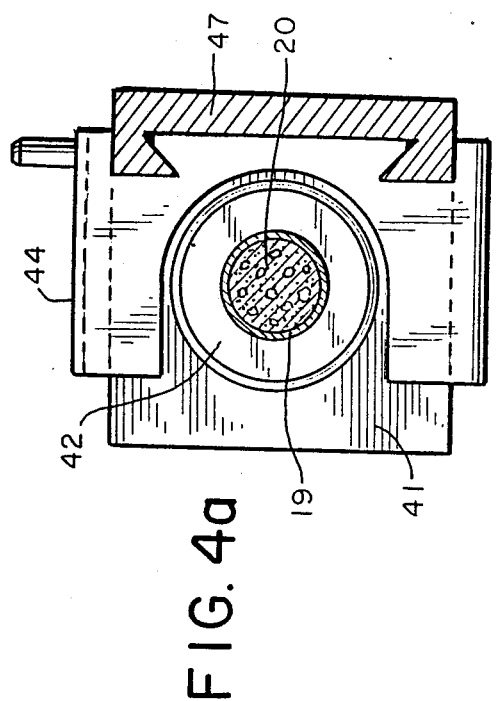
FIG. 4a is a cross-sectional view taken along line 4a—4a of FIG. 4.
Figure 3A:
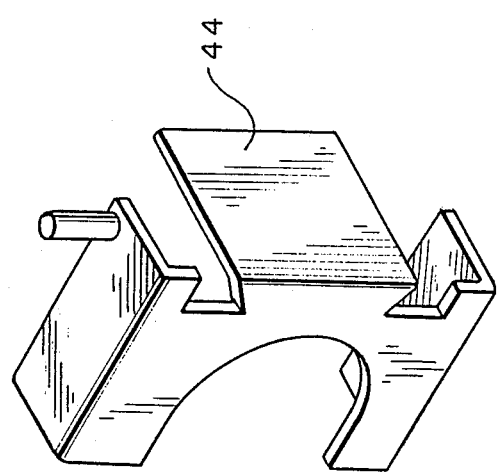
FIG. 3a is a perspective view of the sliding valve shown in FIG. 3.

Also sliding within the track 47, is a sliding valve 44 shown in FIG. 4b and separately in FIG. 3a. This sliding valve 44 is biased by the spring 46 so that when the stuffing block 41 is pulled out of the stuffing position, the sliding valve is pulled back until it contacts the stop pin 50 to thereby cover the port through which the the meat product emulsion leaves the metering pump 28. FIG. 4b shows the sliding valve 44 in the closed position. The use of this sliding valve 44 has been found to be advantageous with the preferred embodiment because it reduces the chances of the meat product leaking onto the top surface 17 as the stuffing block is moved away.

Attached to the rear side of the stuffing block 41 is a plate 43. This plate 43 is configured and positioned so as to activate the switch 38 thereby indicating that the stuffing block 41 and stuffing horn 19 are in position to begin stuffing a new casing.

Figure 4:
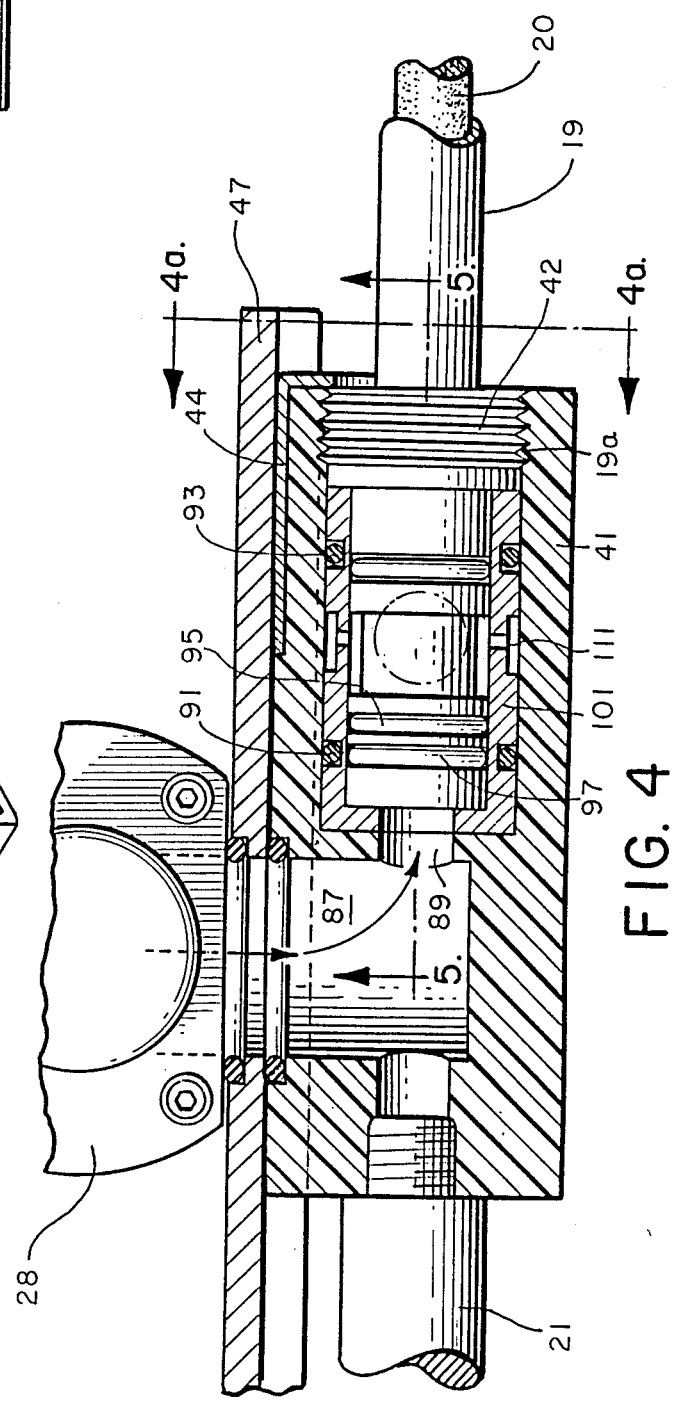
FIG. 4 is a cross-sectional view taken along line 4—4 of FIG. 3.

FIG. 4 is a horizontal cross-sectional view taken along line 4—4 of FIG. 3 which shows the structure of the stuffing block 41 when in the stuffing position. The stuffing block is preferably made from a material such as nylon and includes means for attaching the rod 21 to the rear portion. The block also includes an entrance port 87 for the meat product to enter. Fitted within a cylindrical hole in the block is a nozzle assemble 101. O-rings 91 and 93 are used to insure an air-tight seal. The nozzle assembly has an entrance port 89 for the meat product to enter.

As mentioned above, the stuffing horn 19 is held in the stuffing block by a spanner nut 42, which presses the flared end 19a of the horn into the end of the nozzle assembly.

Figure 7:
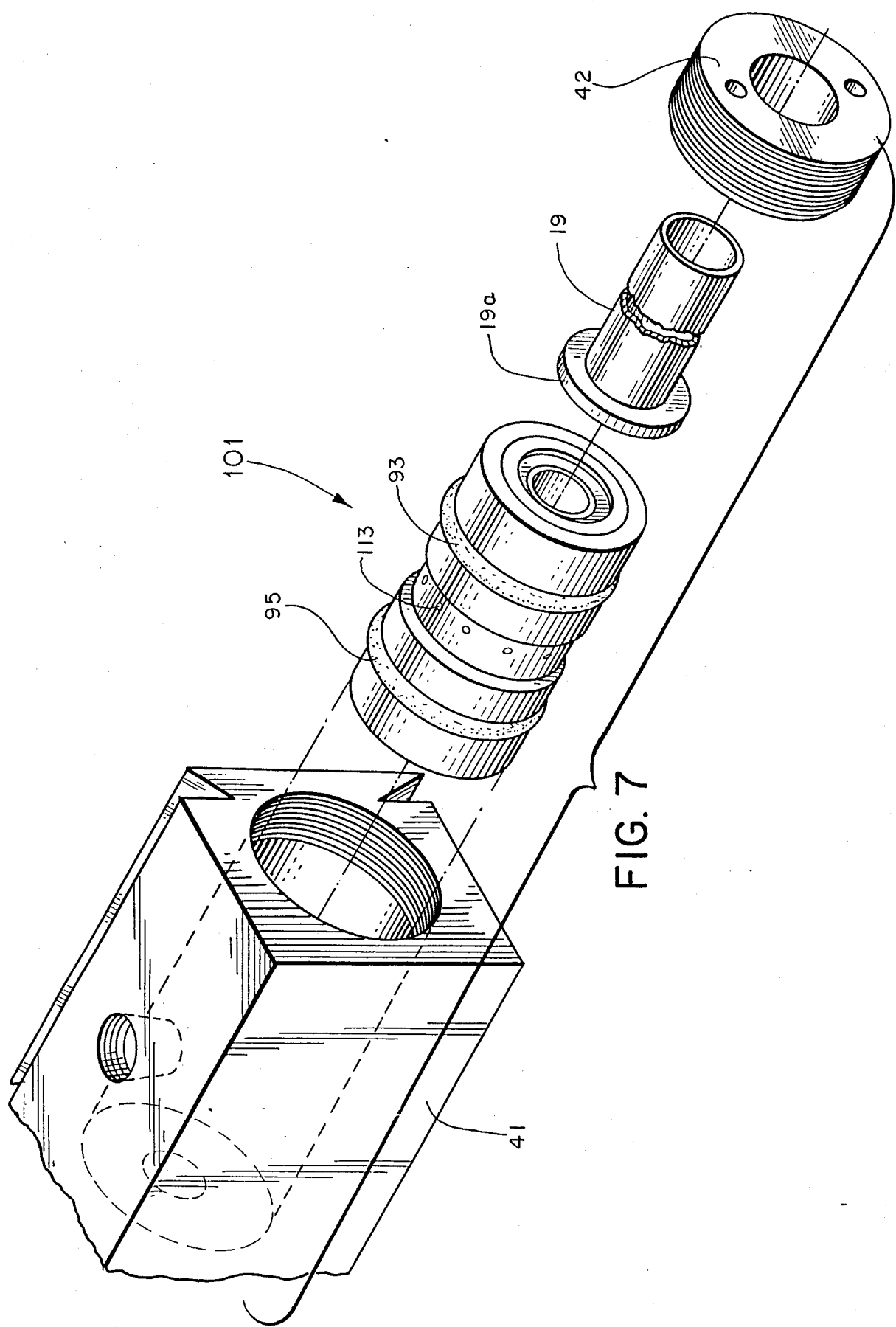
FIG. 7 is a partially exploded view of the stuffing block of the machine depicted in FIG. 1.

FIG. 7 illustrate how the nozzle assembly 101 fits into the stuffing block 41.

Figure 5B:
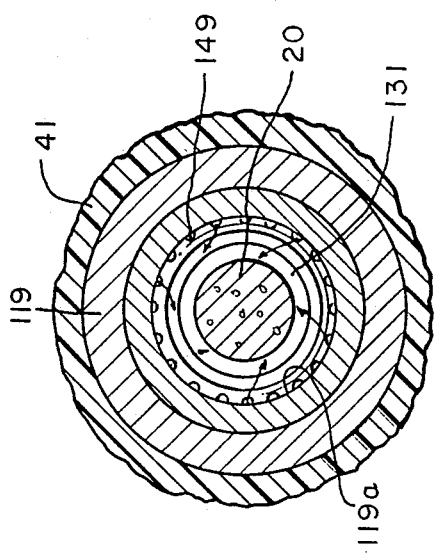
FIG. 5b is a cross-sectional view taken along line 5b—5b of FIG. 5.
Figure 5A:
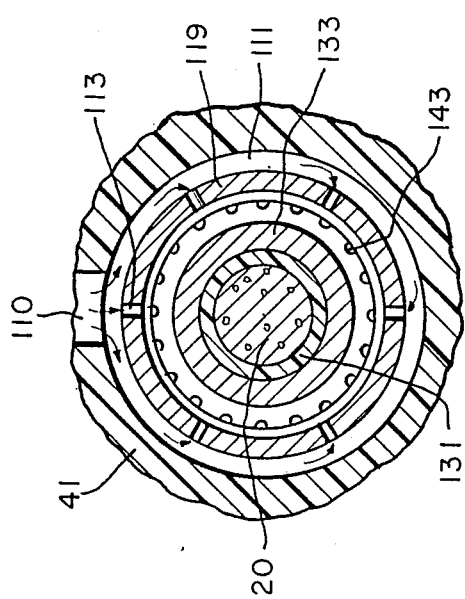
FIG. 5a is a cross-sectional view taken along line 5a—5a of FIG. 5.
Figure 5:
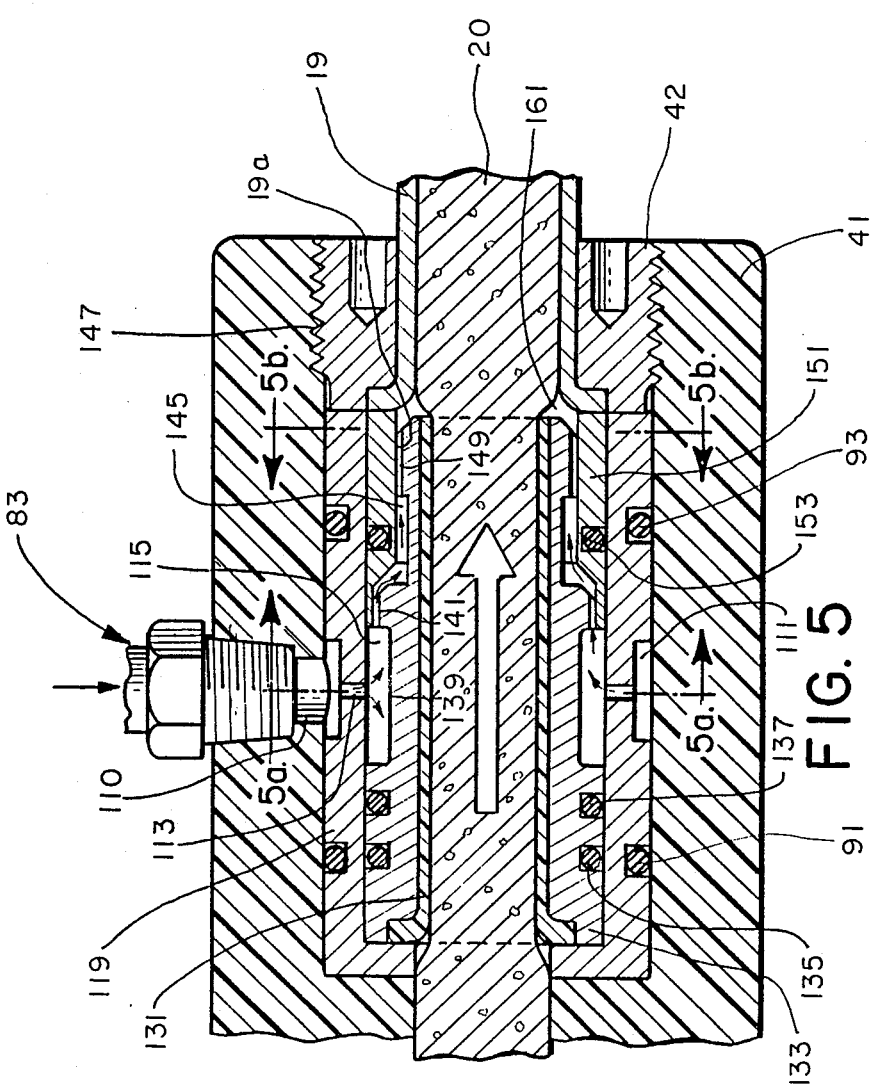
FIG. 5 is a cross-sectional view taken along line 6—6 of FIG. 3.
Figure 8:
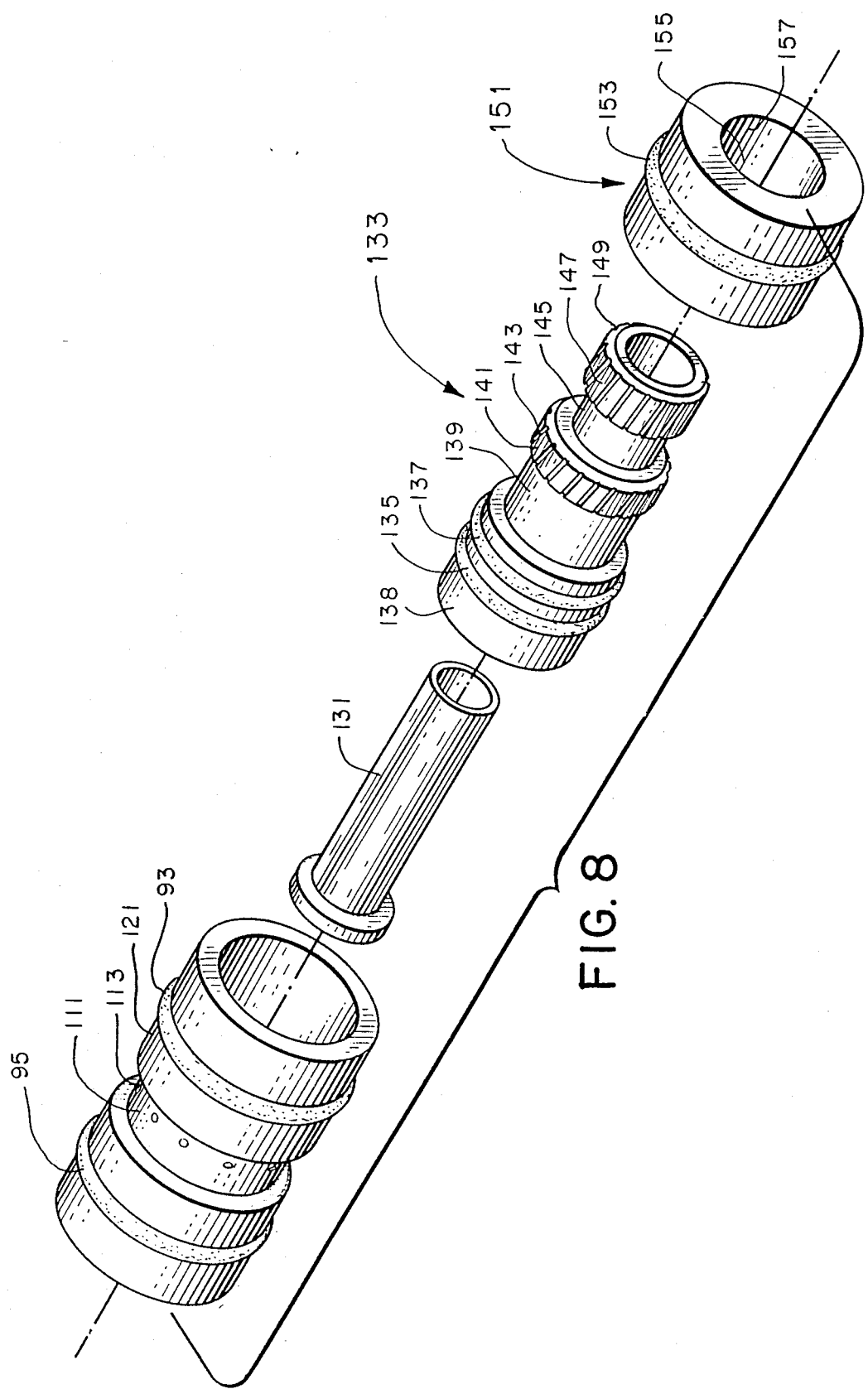
FIG. 8 is an exploded view of the nozzle means shown in FIG. 7.

FIGS. 5 and 8 illustrate the different pieces of the nozzle assembly. The nozzle assembly 101 includes an outer barrel 119, an inner sleeve 131, an inner barrel 133 which fits over the inner sleeve 131 and into the outer barrel 119. The nozzle assembly also includes a covering tube member 151 which fits over the inner barrel 133 and into the end of the outer barrel 119.

The outer barrel includes the O-rings 91 and 93 and a stepped-down portion 111. This stepped-downed portion 111 provides a chamber for the liquid smoke as it enters through the port 110 in the stuffing block. Holes 113 through the stepped down portion allow the liquid smoke to travel into a second chamber 115 which is provided by the stepped-down portion 139 on the inner barrel 133.

The inner barrel 139 includes O-rings 135 and 137 which seal the inner barrel within the outer barrel. To the right of the stepped-down portion 139 is a raised portion or annular ridge 141. Grooves or channels 143 are cut through the raised portion 141. Most preferably, these channels are cut to a depth of about 0.025". Also, these channels are preferably cut in a helical path so as to produce a swirling of the liquid smoke as it passes through. In the depicted embodiment, the channels are cut at a 30° angle from the longitudinal axis.

The inner barrel also includes a second lowered portion 145 and a second raised portion or annular ridge 147. The second raised portion 147 also includes grooves 149, preferably also helical in shape, with the most preferred angle being 30°. Most preferably, the depth of the grooves or channels 149 is about 0.003". The depth of the grooves 149 is more critical than the depth of the grooves 143, because the depth of the grooves 149 will be more important in controlling the thickness of the layer of liquid applied to the stream of meat product.

As mentioned above and as shown in FIG. 6, the preferred flow path for the liquid smoke is spiral. This has been found to be advantageous in that it provides more even distribution of the liquid around the stream of meat product.

Figure 6:
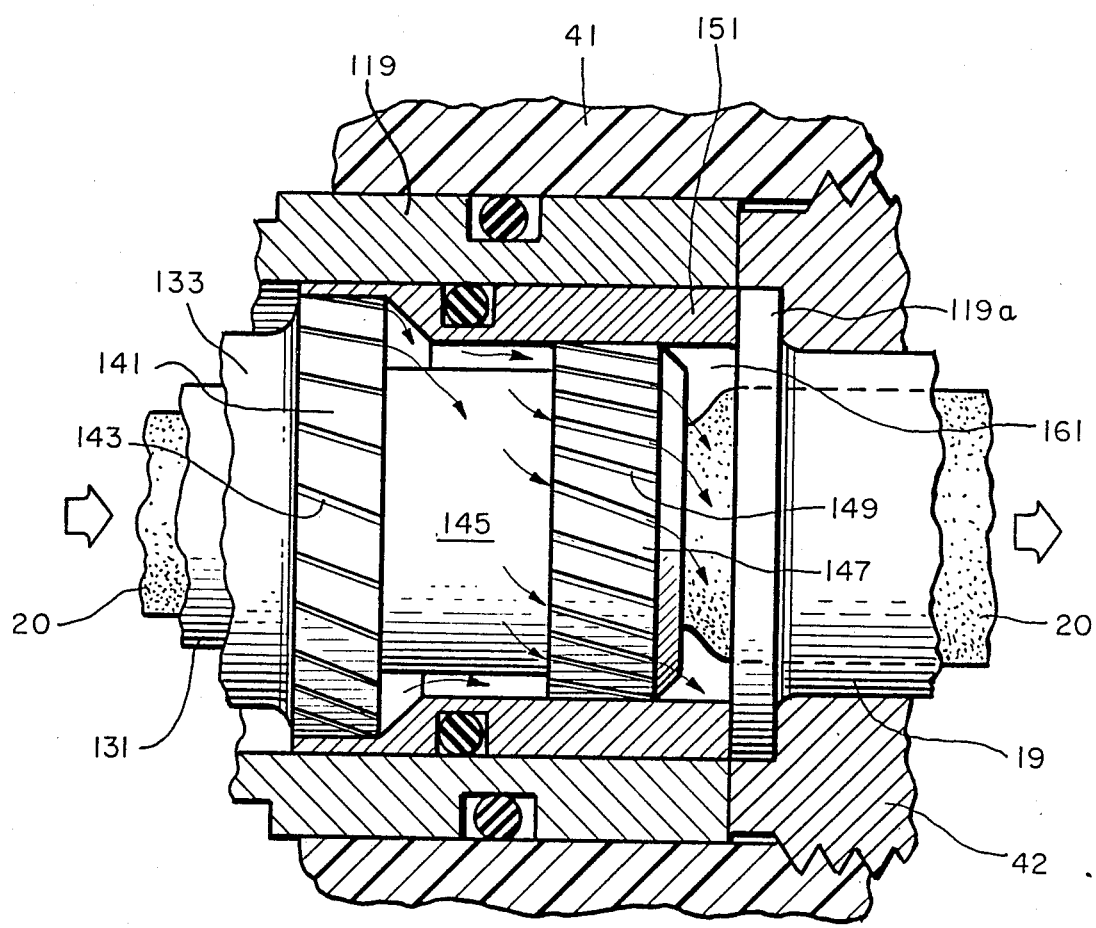
FIG. 6 is a partial cross-sectional view showing the liquid smoke nozzle of the machine depicted in FIG. 1.

The cover tube member 151 includes an O-ring 153 to provide a good seal with the inside of the outer barrel 119. The inside surface of the cover 151 is stepped so as to match up with the diameters presented on the first and second raised portions of the inner barrel 133. In particular, the first inside diameter 155 of the cover 151 mates with the outside diameter of the first raised portion 141 of the inner barrel. The second inside diameter 157 of the cover 151 mates with the outside diameter of the second raised portion 147 of the inner barrel. Thus, the liquid smoke is forced to pass through the channels 143 and 149 in order to exit the nozzle assembly. As mentioned above, because the grooves are cut in a helical direction, a spiral, swirling motion is imparted to the liquid smoke as it travels through the nozzle assembly. FIG. 6 best illustrates the helical paths through the channels and the swirling motion imparted to the liquid smoke.

As seen in FIG. 5, the meat product 20 exits the inner sleeve 131 and the liquid smoke product exits the nozzle assembly at about the same point along the longitudinal axis. As a result, the liquid smoke and the meat product come into contact for the first time in the space 161, i.e. just prior to entering the stuffing horn 19.

Just what happens at this point of contact is not known precisely. It is currently believed that because of the relative high pressures and high flow rates through the nozzle assembly and out the stuffing horn, that a parallel flow is set up between the two liquids, which parallel flow may continue through the length of the stuffing horn 19.

It is also believed that if any mixing does occur, it certainly does not occur to a substantial degree. That is, there is not enough intermixing to interfere with the properties of the sausage product. This is likely due to the fact that any intermixing that does occur is limited to a very shallow depth into the stream of meat product. In particular, experiments with fluorescent dyes in the outer liquid have shown that the outer liquid penetrates the meat product to less than one millimeter after the sausage is cooked. This depth penetration with the present invention is similar to that observed through conventional smoking processes.

Accordingly, whether the success of the present invention in applying liquids such as liquid smoke to sausages without the otherwise attendant interference with the characteristics of the sausage is due to the fact that there is either no intermixing during stuffing, or that any intermixing is kept to a relatively shallow depth within the stream of meat product, is not known. However, experimental data has shown that the invention does indeed accomplish this object.

The relative amounts of liquid to be applied may be varied according to the present invention. The amount of liquid applied should usually be quite small in relation to the amount of the meat product. Preferably, the weight ratio of liquid to meat product should be between about 1:25 and about 1:2500, most preferably, between about 1:40 and about 1:400.

Also, the ratio of the pressure of the liquid to the pressure of the stream of the meat product is important to the operation of the invention. Generally, the pressure of the liquid smoke should be higher than that of the stream of meat product. Preferably, the pressure of the liquid is between about 150 and about 300 percent of the pressure of the meat product, most preferably, about 200 percent.

FIGS. 9, 10, and 11 illustrate an alternative to the preferred embodiment. In this embodiment, the nozzle assembly 101 is replaced by a set 201 of matching discs 203 lined up side to side with matching center holes 205.

This set of discs is inserted into the sleeve 213 which is inserted into the stuffing block 207. The flared end 219a of the stuffing horn 219 is pushed against the end of the stack 201 and the spanner nut 242 is threaded down to control the compression between the discs 203. As seen in FIG. 10, the stream of meat product is made to pass through the center holes and liquid smoke is pumped at a relatively high pressure through the holes 215 in the sleeve 213 so as to surround the outer surface of the stack of discs. When the proper pressure is applied to the liquid smoke, it is forced between adjacent discs and thereby comes into contact with the stream of meat product. Thus, by adjusting the compression between the discs through the spanner nut 242, and by adjusting the pressure of the liquid smoke in the chamber 211, the flow rate of the liquid smoke being applied to the stream of meat product can be precisely controlled.

In another alternative, not shown, to the preferred embodiment, the stack of discs shown in FIG. 9 is replaced by a porous sleeve. In particular, the stream of meat product is made to pass through the center of a sleeve which includes microscopic pores. Surrounding the sleeve is a chamber of pressurized liquid smoke. The pore size and pressure of the stream of meat product and the pressure of the liquid smoke are selected so as to apply a relatively thin layer of the liquid smoke onto the external surface of the stream of meat product. In this embodiment, the porous sleeve would act as a nozzle for the stream of meat product as well as a nozzle for the liquid smoke.

It will be appreciated that the above description has dealt with the preferred and certain alternative embodiments of the present invention. This description is provided by way of example and explanation and is not seen as limiting the scope of the invention to those embodiments described. For example, although much of the discussion has dealt with an apparatus for making hot dogs, the present invention is suited to be used with apparatus for making other types of sausage. In addition, although much of the discussion has dealt with the application of liquid smoke, other liquids and liquid flavorings can also be applied through the present invention. Certainly, these and other modifications can be made to these described embodiments without departing from the scope of the invention as defined by the appended claims.

I claim:

1. In an apparatus for making sausages by stuffing a stream of meat product into a casing, the improvement comprising means for applying a thin layer of liquid at the perimeter of the stream of meat product, said means comprising:

pump means for pumping said liquid;
   first nozzle means for directing a stream of means product through a stuffing horn and into the casing; and
   second nozzle means for directing a stream of liquid into contact with the stream of meat product before the stream of meat product exits the stuffing horn, which second nozzle means is configured and positioned so that said stream of liquid is directed into a thin layer at the perimeter of the stream of meat product.

2. The improvement of claim 1 wherein the second nozzle means is adapted to direct the stream of liquid in the same general direction as the first nozzle means directs the stream of meat product.

3. The improvement of claim 1 wherein the second nozzle means is adapted to direct the stream of liquid around the entire circumference of the stream of meat product.

4. The improvement of claim 1 wherein the second nozzle means includes a plurality of separate narrow channels through which the liquid must pass, to thereby create a predetermined flow pattern in the stream of liquid.

5. The improvement of claim 4 wherein the channels are formed in a generally helical direction to thereby create a spiral flow in the stream of liquid.

6. The improvement of claim 1 wherein the pump means is adapted to pump, and the second nozzle means is adapted to direct a liquid which is selected from the group consisting of water, flavorants, colorants, preservatives, casing treatments and liquid smoke.

7. The improvement of claim 6 wherein the liquid is liquid smoke.

8. The improvement of claim 6 wherein the liquid is a casing treatment which reduces adhesion of the casing to the sausage.

9. The improvement of claim 6 wherein the liquid is a casing treatment which increases adhesion of the casing to the sausage.

10. The improvement of claim 1 wherein the first and second nozzles are designed so as to avoid substantial intermixing of the stream of liquid with the stream of meat product during stuffing.

11. The improvement of claim 1 wherein the first and second nozzle means are adapted so that the thickness of the stream of liquid is less than about 10 percent of the diameter of the stream of meat product.

12. The improvement of claim 1 wherein the pump means is adapted to pump the stream of liquid at a pressure between about 200 and about 250 p.s.i.

13. The improvement of claim 1 wherein the pump means and first and second nozzle means are adapted so that the stream of liquid has a pressure which is between about 150 and about 300 percent of the pressure at which the stream of meat is pumped at.

14. The improvement of claim 1 wherein the pump means and first and second nozzle means are adapted so that the stream of liquid is pumped so as to provide a weight ratio of liquid to meat product of between about 1:25 and about 1:2500 as the two stream enter the casing.

15. The improvement of claim 1 wherein the pump means and first and second nozzle means are adapted so that the stream of liquid is pumped so as to provide a weight ratio of liquid to meat product of between about 1:40 and about 1:400 as the two streams enter the casing.

16. The improvement of claim 1 wherein the second nozzle means comprises:

a first tube member which includes a first annular ridge with channels cut therethrough, which channels pass from the side of the first annular ridge which is distal from the casing to the side which is proximate thereto;
   a second tube member which has an end distal to the casing with an inside diameter approximately equal to the diameter of the first annular ridge, whereby when the distal end of the second tube member is fitted over the first annular ridge, the entire stream of liquid must pass through the channels in the first annular ridge as it travels toward the casing.

17. The improvement of claim 16 wherein the channels in the first annular ridge are cut at an angle to the direction toward the casing to thereby produce a generally spiral motion in the stream of liquid.

18. The improvement of claim 16 wherein the second nozzle means further comprises:
   a second annular ridge on the first tube member which has a diameter smaller than the diameter of the first annular ridge, and which also includes channels cut therethrough, which channels pass from the side of the second annular ridge which is distal to the casing to the side which is proximate thereto;
   a portion of the second tube member which has an inside diameter approximately equal to the diameter of the second annular ridge, whereby when the distal end of the tube member is fitted over the first annular ridge, and the portion of the second tube member is fitted over the second annular ridge, the entire stream of liquid must pass through the channels in the first annular ridge, and the channels in the second annular ridge as it travels toward the casing.

19. The improvement of claim 18 wherein the channels in the second annular ridge are cut at an angle to the direction toward the casing to thereby produce a generally spiral motion in the stream of liquid.

20. The apparatus of claim 1 wherein the pump means is adapted to pump, and the second nozzle means is adapted to direct a liquid which is selected from the group consisting of water, flavorants, colorants, preservatives, casing treatments and liquid smoke.

21. The apparatus of claim 1 wherein the first and second pump means and the nozzle means are adapted so as to provide a weight ratio of liquid to meat product of between about 1:25 and about 1:2500 as the two streams enter the casing.

22. An apparatus for making sausages by stuffing a stream of meat product into a casing comprising:
   a tubular stuffing horn means for directing a stream of meat product into a casing;
   first pump means for pumping the stream of meat product through the stuffing horn means;
   means for applying a thin layer of liquid at the perimeter of the stream of meat product, said means comprising:
      second pump means for pumping said liquid;
      nozzle means for directing a stream of liquid into contact with the stream of meat product before the stream of meat product exits the stuffing horn, which nozzle means is configured and positioned so that said stream of liquid is directed into a thin layer at the perimeter of the stream of meat product.

23. The apparatus of claim 22 wherein the second nozzle means is adapted to direct the stream of liquid in the same general direct as the first nozzle means directs the stream of meat product.

24. The apparatus of claim 22 wherein the second nozzle means is adapted to direct the stream of liquid around the entire circumference of the stream of meat product.

25. The apparatus of claim 22 wherein the second nozzle means includes a plurality of separate narrow channels through which the liquid must pass, to thereby create a predetermined flow pattern in the stream of liquid.

26. The apparatus of claim 22 wherein the nozzle means is designed so as to avoid substantial intermixing of the stream of liquid with the stream of meat product during stuffing.

27. The apparatus of claim 22 wherein the nozzle means is adapted so that the thickness of the stream of liquid is less than about 10 percent of the diameter of the stream of meat product.

28. The apparatus of claim 22 wherein the first pump means is adapted to pump the stream of liquid at a pressure between about 200 and about 250 p.s.i.

29. The apparatus of claim 22 wherein the first and second pump means and the nozzle means are adapted so that the stream of liquid is pumped at a pressure which is between about 150 and about 300 percent of the pressure at which the stream of meat is pumped at.

30. The apparatus of claim 22 wherein the first and second pump means and the nozzle means are adapted so as to provide a weight ratio of liquid to meat product of between about 1:40 and about 1:400 as the two streams enter the casing.

31. The apparatus of claim 22 wherein the nozzle means comprises:
   a first tube member which includes a first annular ridge with channels cut therethrough, which channels pass from the side of the first annular ridge which is distal from the casing to the side which is proximate thereto;
   a second tube member which has an end distal to the casing with an inside diameter approximately equal to the diameter of the first annular ridge, whereby when the distal end of the second tube member is fitted over the first annular ridge, the entire stream of liquid must pass through the channels in the first annular ridge as it travels toward the casing.

32. The apparatus of claim 31 wherein the nozzle means further comprises:
   a second annular ridge on the first tube member which has a diameter smaller than the diameter of the first annular ridge, and which also includes channels cut therethrough, which channels pass from the side of the second annular ridge which is distal to the casing to the side which is proximate thereto;
   a portion of the second tube member which has an inside diameter approximately equal to the diameter of the second annular ridge, whereby when the distal end of the tube member is fitted over the first annular ridge, and the portion of the second tube member is fitted over the second annular ridge, the entire stream of liquid must pass through the channels in the first annular ridge, and the channels in the second annular ridge as it travels toward the casing.

33. The apparatus of claim 32 wherein the channels in the second annular ridge are cut at an angle to the direction toward the casing to thereby produce a generally spiral motion in the stream of liquid.

34. The apparatus of claim 33 wherein the channels in the first annular ridge are cut at an angle to the direction toward the casing to thereby produce a generally spiral motion in the stream of liquid.

35. An apparatus for making sausages by stuffing a stream of meat product into a casing comprising:
   a tubular stuffing horn means for directing a stream of meat product into a casing;
   first pump means for pumping the stream of meat product through the stuffing horn means; and means for applying a thin layer of liquid at the perimeter of the stream of meat product, said means comprising:

second pump means for pumping said liquid; and nozzle means for directing a stream of liquid into contact with the stream of meat product before the stream of meat product exits the stuffing horn, which nozzle means is configured and positioned so that said stream of liquid is directed into a thin layer at the perimeter of the stream of meat product, wherein the nozzle means comprises:

a first tube member which includes a first annular ridge with channels cut therethrough, which channels pass from the side of the first annular ridge which is distal from the casing to the side which is proximate thereto; and a second tube member which has an end distal to the casing with an inside diameter approximately equal to the diameter of the first annular ridge, whereby when the distal end of the second tube member is fitted over the first annular ridge, the entire stream of liquid must pass through the channels in the first annular ridge as it travels toward the casing;

wherein the first and second pump means are adapted so that the stream of liquid is pumped at a pressure which is between about 150 and about 300 percent of the pressure at which the stream of meat is pumped at.

* * * * *